United States Patent [19]

Nakagawa et al.

[11] Patent Number: 4,594,284

[45] Date of Patent: Jun. 10, 1986

[54] FOUNDATION FOR CARD CLOTHING

[75] Inventors: Mutuo Nakagawa, Takarazuka; Isao Ikkanzaka, Amagasaki; Yasuyuki Uchida, Takarazuka, all of Japan

[73] Assignee: Kanai Juyo Kogyo Co., Ltd., Itami, Japan

[21] Appl. No.: 612,786

[22] Filed: May 22, 1984

[30] Foreign Application Priority Data

May 30, 1983 [JP] Japan .................................. 58-95296
May 30, 1983 [JP] Japan .................................. 58-95297

[51] Int. Cl.⁴ .......................... B32B 5/06; B32B 5/14; B32B 5/18
[52] U.S. Cl. .................................... 428/234; 428/246; 428/248; 428/267; 428/282; 428/300; 428/304.4
[58] Field of Search ............... 428/234, 235, 267, 280, 428/282, 300, 304.4, 246, 247, 248

[56] References Cited

U.S. PATENT DOCUMENTS

| | | | |
|---|---|---|---|
| 2,857,654 | 10/1958 | Sexton | 428/246 |
| 3,350,331 | 10/1967 | Liebling | 428/480 |
| 4,107,367 | 8/1978 | Fekete | 428/246 |
| 4,109,543 | 8/1978 | Foti | 428/246 |
| 4,172,917 | 10/1979 | Angelle et al. | 428/282 |
| 4,255,817 | 3/1981 | Heim | 428/267 |
| 4,265,962 | 5/1981 | May | 428/252 |
| 4,284,680 | 8/1981 | Awano et al. | 428/234 |
| 4,439,273 | 3/1984 | Curry | 428/280 |
| 4,463,465 | 8/1984 | Parker et al. | 428/280 |

*Primary Examiner*—William J. Van Balen
*Attorney, Agent, or Firm*—Wenderoth, Lind & Ponack

[57] ABSTRACT

A foundation for card clothing using a needle punch felt or a foamed needle punch felt for its surface layer and its base layer. At least one layer of cloth made of aromatic polyamide fiber yarn is bonded to one side of the base layer of needle punch felt, foamed needle punch felt or foamed non-woven fabric.

This foundation for card clothing has high tensile strength, is less in elongation percentage, supports carding wires well, is excellent in elastic recovery and improves durability of card clothing to a large extent.

10 Claims, 7 Drawing Figures

FOUNDATION FOR CARD CLOTHING

BACKGROUND OF THE INVENTION

1. Field of the Invention

This invention relates to the formation of a foundation for card clothing to be used on a carding engine for woolen spinning and special spinning and and also for a raising machine.

2. Prior Art

Conventionally, a foundation for card clothing is manufactured in the following way. As shown in FIG. 1, a plurality of layers of woven fabric 1 of cotton, linen or synthetic fiber are bonded together with a natural rubber adhesive 2 in a standard thickness and a surface layer 3 of rubber, felt, resin sheet or the like is bonded to the above base layer with a synthetic rubber adhesive 4. The foundation fabric thus made is fitted with carding wires as card clothing, which is wound round a cylinder, a doffer, etc. of a carding engine for opening and carding fibers. Since this card clothing is wound round a cylinder and others which revolve at a high speed for carding fibers, it is required to have considerable strength and to support firmly carding wires fitted thereto. Therefore, the following characteristics are required for a card clothing.

(1) It has uniform thickness and high tensile strength.

(2) It extends only slight under tension and can be tightly wound round a rotary cylindrical body, such as a cylinder.

(3) It has enough carding wire supporting force to resist loads applied to carding wires during a carding operation and sufficient elastic force to assist the recovery of the carding wires from deformation.

In order to meet the requirements of the above characteristics, it is the usual practice to apply gum prepared by solving natural rubber or synthetic rubber in an organic solvent, such as gasoline, benzene, etc., several times to a woven fabric of linen, cotton, etc. having a high tensile strength and small extension so that the fabric is impregnated with gum and a gum layer of constant thickness is formed. This gum layer serves to maintain the elastic force of the foundation for card clothing and improves the supporting force of the carding wires. Also, for the purpose of buffering the stress applied to carding wires, a rubber sheet layer, a foamed rubber layer, a resin sheet layer, a foamed resin layer or a felt layer is provided at the surface to impart softness, elasticity and buffering properties to the foundation.

In the case of a conventional foundation for card clothing, in order to meet the requirements of various physical properties, it uses costly woolen felt or is subjected to a laminating process, with repeated applications of gum and use of woven fabrics of natural fiber, such as cotton or linen. Therefore, it involves high manufacturing costs.

Some of the conventional foundations for card clothing use at least one layer of non-woven fabric, but as the non-woven fabric is low in density and is easily deformed by compressing, such foundations are creased easily and raises problems when fitting carding wires thereto. Thus, such foundations involve the disorder of carding wire rows and adhesion in the compressed and deformed state when laminating, with resultant irregularity of thickness. Moreover, since the non-woven fabric is low in strength, satisfactory tearing strength and satisfactory elongation at constant stretching cannot be obtained, even if it is used in combination with cotton woven fabric and polyester woven fabric.

In the present invention, an intertwined fiber mat, namely, a needle punch felt or a foamed needle punch felt is used for a surface layer and a base layer of carding clothing for use on a carding engine and a raising machine for woolen spinning, special spinning, etc. and the base layer is reinforced by lamination, for example, by laminating a synthetic fiber woven fabric on one side and a natural fiber woven fabric on the other side or laminating of one or plural layers of natural fiber woven fabric on both sides. Such foundation for card clothing will meet the requirements of various characteristics mentioned above and is comparatively low in cost.

BRIEF EXPLANATION OF THE DRAWINGS

The nature and advantages of the present invention will be understood more clearly from the following description made with reference to the accompanying drawings, in which.

DETAILED EXPLANATION OF THE INVENTION

The surface layer A comprises a needle punch felt 5. This needle punch felt 5 is made of synthetic fiber (such as polyester, polypropylene, polyamide, acryl, carbon fiber), conjugate fiber (of acrylic, polyamide, polyester, polyolefin, elastomer types), inorganic fiber (such as glass fiber, metallic fiber), chemical fiber (such as cupraacetate fiber) or natural fiber of wool, either singly or in combination. The above-mentioned fiber is opened by a carding engine and a fiber mat formed is subjected to the needle punching process by a needle punching machine for formation into the needle punch felt 5. This needle punch felt is subjected to heating and compressing, where necessary. Furthermore, where necessary, the needle punch felt is impregnated with a synthetic rubber, such as NBR (acrylonitrile-butadiene copolymer rubber), SBR (styrene-butadiene copolymer rubber), CR (chloroprene rubber), etc. or synthetic resin emulsion of epoxy resin, acrylic resin, ethylene vinyl acetate copolymer, polyurethane, vinyl chloride, vinylidene chloride or the like and then subjected to heating and compressing. The apparent density of the needle punch felt 5 is 0.15–0.40 g/cm$^3$.

The needle punch felt 5 of the surface layer A can be of density grading type, namely, the density of the surface layer is varied gradually from the upper part to the lower part. Also, the needle punch felt of high density and no fluffiness at the surface can be formed by subjecting a needle punch felt made of thermo-fusing composite fiber of sheath and core type, side-by-side type, etc. to heating and pressing. It is possible to impart a three-dimensional effect to each of the above-mentioned needle punch felts by combining a synthetic fiber of a modified cross section.

The needle punch felt which constitutes the surface layer A can be a foamed needle punch felt which is made by impregnating a needle punch felt with a a synthetic rubber, synthetic resin, etc. containing a foaming agent or can be a foam sheet of rubber or resin, for example, CR (chloroprene rubber), NMR (acrylonitrile-butadiene copolymer rubber), SBR (styren-butadiene copolymer rubber), PUR (polyurethane resin), PVC (polyvinyl chloride resin), etc.

Figure 3:
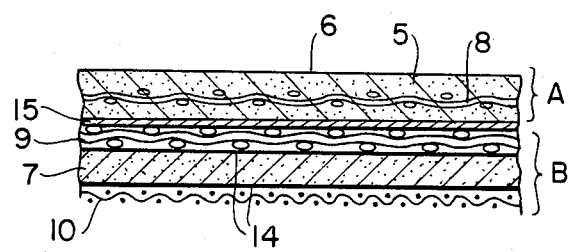

The surface layer A may be such needle punch felt 6, as shown by FIG. 3, which interposes a plain weave having an aromatic polyamide fiber yarn, a carbon fiber yarn, a polyester fiber yarn, a polyproplene fiber yarn, or the like at least as warp, a netlike sheet or a tire fabric 8.

The surface layer A is required to have enough carding wire supporting force to resist loads applied to carding wires, efficient elasticity to assist recovery of the carding wires from deformation and also buffering properties. Therefore, a needle punch felt made of synthetic fiber such as polyester, acryl, polyamide, polyproplene or the like having high elasticity and bulkiness is preferred.

Figure 1:
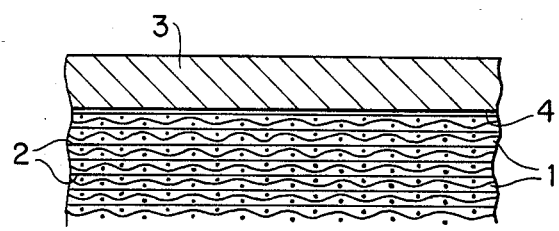
FIG. 1 is a cross section, on an enlarged scale, of a conventional foundation for card clothing.
Figure 2:
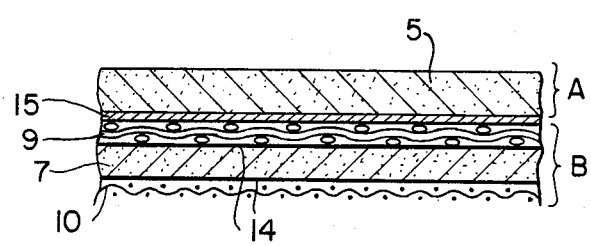
FIG. 2, FIG. 3, FIG. 4, FIG. 5, FIG. 6 and FIG. 7 show, respectively, a cross section, on an enlarged scale, of a foundation according to the present invention, in which A is a surface layer and B is a base layer.
Figure 4:
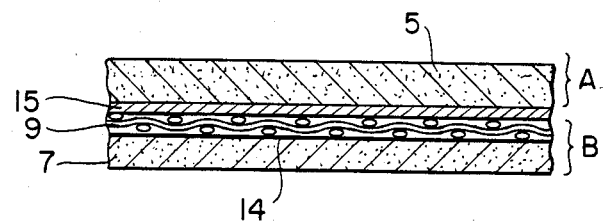
Figure 5:
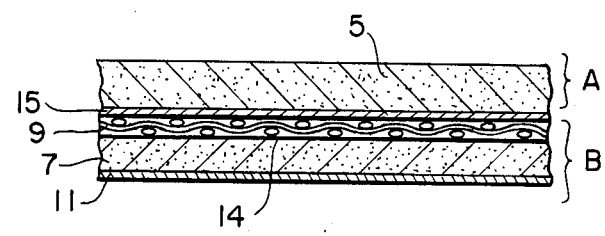
Figure 6:
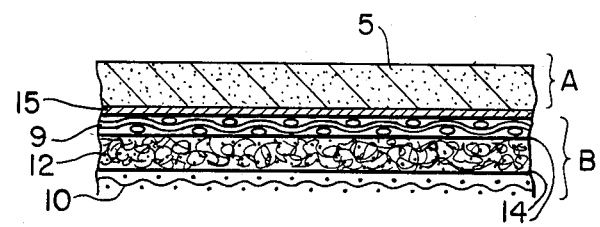

As shown in FIG. 2 and FIG. 3, the base layer B is composed of a needle punch felt 7 of the same kind of fiber as the surface layer, having at one side thereof one or more woven fabrics 9 with an aromatic polyamide fiber yarn (Aramid fiber), at least as warp for reinforcing purposes, and at the other side thereof one or more natural fiber woven fabric (such as cotton cloth, linen cloth, etc.) or one or more woven fabrics 10 a polyester fiber yarn at least as warp. Alternatively, as shown in FIG. 4, at only one side of the needle punch felt 7 is provided a cloth 9 woven of aromatic polyamide fiber yarn at least as warp, or, as shown in FIG. 5, at the other side of the needle punch felt 7 is provided a layer coated with rubber, resin or the like or a sheet-like layer 11.

In the base layer B, laminates are bonded together with a layer coated with rubber or resin adhesive 14 or by heat adhesion.

The base layer B may be composed of a cloth woven of aromatic polyamide fiber yarn at least as warp and a cotton cloth.

The needle punch felt 7 of the base layer B is formed of the same kind of fiber shown for the formation of the surface layer A, either singly or in combination, but such needle punch felt which is made of synthetic fiber such as polyester, acryl, polyproplene, polyamide or the like and is impregnated with synthetic rubber or synthetic resin to attain the apparent density ranging from 0.20 g to 0.70 g/cm$^3$ is preferred.

With regard to the foundation for card clothing shown in FIG. 2, the needle punch felt 7 can be substituted by a foamed needle punch felt 12 or a foamed non-woven fabric 12 impregnated with synthetic rubber or synthetic resin containing a foaming agent.

Figure 7:
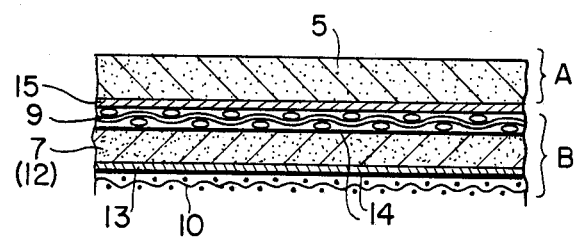

In order to avoid damage on the needle punch felt when pulling carding wires by a wire puller, a reinforcing layer 13 (a layer coated with polyamide, polyester, polyethylene, polypropylene, vinyl chloride, ethylene vinyl acetate, vinyl acetate, urethane or the like or non-woven fabric of polyethylene or polypropylene) can be interposed between the needle punch felt 7 (the foamed needle felt 12 or the foamed non-woven fabric 12) and the cloth 10 of natural fiber woven fabric or polyester fiber yarn by means of coating, adhesive, fusing, etc., as shown in FIG. 7.

The cloth 9 which is a reinforcing material for the base layer B is a fabric woven of spun yarn of aromatic polyamide fiber or filament yarn at least as warp or a woven fabric of synthetic fiber, such as polyester, acryl, polypropylene, etc., cotton or linen, and is an elastic layer of high density having the required thickness and strength. Such woven fabric supports carding wires of U-shape firmly, is free from such problems, i.e. as the wire slipping off, is free from wire-breaking and the wire falling off due to excessive stress, has good elasticity, is free from elongation due to deformation by stress relief and creep caused by winding tension in winding round a card drum, and prevents "foundation floating".

The base layer B and the surface layer A are bonded together by a layer 15 coated with an adhesive of synthetic rubber or synthetic resin.

Silicone rubber, chloroprene rubber, phenolics, butyl rubber, polyurethane, acryl, etc. are suitable for the above-mentioned synthetic rubber or synthetic resin bonding agent.

The composition of the foundation for card clothing according to the present invention is not limited to those shown in FIG. 2–FIG. 7 but the proper combination of the surface layer A and the base layer B is possible.

The present invention will be described more in detail with respect to concrete embodiments.

Embodiment 1

A uniformly opened fiber mat comprising a compounding ratio of polyester fiber 12d×51 m.m. 30%/polyester fiber 6d×51 m.m. 70% was needle-punched at the punching density of 300 punches/cm$^2$ by a needle punching machine from top and bottom sides and was made into a needle punch felt of 4.5 m.m. in thickness and 750 g/m$^2$ in "METSUKE" (weight per unit area). Then, the needle punch felt was impregnated with a resin impregnating solution mainly consisting of NBR latex, dried, bridged and pressed for formation of a needle punch felt of 4.0 m.m. in thickness, 1,120 g/m$^2$ in "METSUKE" (weight per unit area) and 0.28 g/cm$^3$ in apparent density. This needle punch felt was used as a surface layer A.

Next, a uniformly opened and laminated fiber mat of polyester fiber 3d×76 m.m. 100% was made into a needle punch felt of 3.5 m.m. in thickness and 500 g/m$^2$ in METSUKE (weight per unit area) by punching it from top and bottom sides by a punching machine at the punching density of 400 punches/cm$^2$. Then, the needle punch felt was impregnated with a resin solution mainly consisting of SBR latex, dried, bridged and pressed for formation into a needle punch felt of 2.0 m.m. in thickness, 800 g/m$^2$ in METSUKE (weight per unit area) and 0.400 g/cm$^3$ in apparent density. This needle punch felt was laminated at one side with a woven fabric (warp 20s two-ply yarn 64/inch; weft 16s single yarn 50/inch, plain weave) and at the other side with a cotton fabric (warp 30s two-ply yarn 74/inch; weft 16s single yarn 67/inch, twill). It was used as a base layer. Then, chloroprene rubber adhesive was coated on the surface of aromatic polyamide woven fabric (base layer) which was laminated with the surface layer to be made into a foundation for card clothing of aggregate thickness of 7.5 m.m.

The above foundation for card clothing (A) was tested for tearing strength and elongation percentage at 160 kg constant load, in comparison with a conventional foundation for card clothing (B) obtained by bonding together a wool felt and seven cotton cloths with a synthetic rubber adhesive. The result was as shown in the following Table 1.

TABLE 1

| Sample | Tearing strength | Elongation percentage at 160 kg constant load |
| --- | --- | --- |
| Foundation for card clothing (A) | 900 kg/52 m.m. | 3.5% |
| Foundation for card clothing (B) | 620 kg/52 m.m. | 6.2% |

As is obvious from the above table, the foundation for card clothing (A) shows an elongation percentage of 6.2%, a reduction by almost half from the conventional one, and also shows improvement in tearing strength. In addition, the foundation (A) shows an improvement in respect of carding wire condition, is free from carding wire-falling and shows good carding wire rows. It has been found that the foundation (A) according to the present invention is free from deformation and stretch by winding load and is less in the variation of constant pressure after drum winding and involves no "foundation floating".

Embodiment 2

A uniformly opened fiber mat comprising a compounding ratio of polyester fiber 12d×51 m.m. 30%/polyester fiber 6d×51 m.m. 70% was needle-punched by a needle punching machine from top and bottom sides at a punching density of 300 punches/cm$^2$ for formation into a needle punch felt of 750 g/m$^2$ in METSUKE (weight per unit area) and 4.5 m.m. in thickness. Then, this needle punch felt was impregnated with a resin solution mainly comprising NBR latex, dried, bridged and pressed into a needle punch felt of 960 g/m$^2$ in METSUKE (weight per unit area), 4.0 m.m. in thickness and 0.24 g/cm$^3$ in apparent density for use as a surface layer.

Then, a uniformly opened and laminated fiber mat of polyester fiber 3d×76 m.m. 100% was needle-punched by a needle punching machine from top and bottom sides at the punching density of 400 punches/cm$^2$ for formation into a needle punch felt of 500 g/m$^2$ in METSUKE (weight per unit area), 3.0 m.m. in thickness. Then, this needle punch felt was impregnated with a resin solution mainly comprising SBR latex, dried, bridged and pressed into a needle punch felt of 680 g/m$^2$ in METSUKE (weight per unit area), 1.6 m.m. in thickness and 0.42 g/cm$^3$ in apparent density. To one side of the above needle punch felt was bonded aromatic polyamide cloth as a base layer with a rubber adhesive. The base layer and the surface layer were bonded together with a chloroprene rubber adhesive or a rubber adhesive and thus a foundation for card clothing with an aggregate thickness of 6.2 m.m. was formed.

The above foundation (C) for card clothing according to the present invention was tested for tearing strength and elongation percentage under 160 kg constant load, in comparison with a conventional foundation (D) for card clothing obtained by bonding together a conventional wool felt (thickness 3 m.m.), five cotton cloths and a rubber sheet with a natural rubber adhesive or a synthetic rubber adhesive. The result was as shown in the following Table 2.

TABLE 2

| Sample | Tearing strength | Elongation percentage under 160 kg constant load |
| --- | --- | --- |
| Foundation (C) for card clothing | 850 kg/52 m.m. | 8.8% |
| Foundation (D) for card cloting | 400 kg/52 m.m. | 7.3% |

As can be seen from the above table, the foundation (C) for card clothing shows much improvement in the elongation percentage under constant load and tearing strength, although it dispenses with cotton cloth and rubber sheet. Such foundation for card clothing is most suitable as a card clothing for fancy and for raising in woollen spinning and special spinning, with resultant decrease in cost and improvement in quality.

Embodiment 3

A uniformly opened fiber mat of the compounding ratio of polyester fiber 12d×51 m.m. 30%/polyester fiber 6d×51 m.m. 70% was needle punched by a needle punching machine from top and bottom sides at the punching density of 300 punches/cm$^2$ for formation into a needle punch felt of 750 g/m$^2$ in METSUKE (weight per unit area) and 4.5 m.m. in thickness. Then, this needle punch felt was impregnated with a resin solution mainly comprising NBR latex, dried, bridged and pressed into a needle punch felt of 1,120 g/m$^2$ in METSUKE (weight per unit area), 4.0 m.m. in thickness and 0.28 g/cm$^3$ in apparent density.

Next, a uniformly opened and laminated fiber mat of polyester fiber 3d×76 m.m. 100% as a base layer was needle punched by a needle punching machine from top and bottom sides at the punching density of 400 punches/cm$^2$ into a needle punch felt of 600 g/m$^2$ in METSUKE (weight per unit area) and 4.0 m.m. in thickness. This needle punch felt was impregnated with a resin solution mainly comprising SBR latex, dried, bridged and pressed into a needle punch felt of 1,250 g/m$^2$ in METSUKE (weight per unit area), 2.5 m.m. in thickness and 0.50 g/cm$^3$ in apparent density. A woven fabric of plain weave (using Kevlar 29 (made by Du Pont) 20s two-ply yarn 64/inch as warp and cotton 16s single yarn 50/inch as weft) was bonded to one side of the needle punch felt with a natural rubber gum as base layer and a chloroprene rubber adhesive was coated on the surface of the base layer, which was bonded to the surface layer of the needle punch felt. Then, the back side of the base layer of the needle punch felt was coated with resin or film of polypropylene, polyurethane, ethylene vinyl chloride copolymer, SBR, NBR, CR or the like and thus a foundation for card clothing of aggregate thickness of 7.7 m.m. was obtained.

The foundation (E) for card clothing according to the present invention was tested for tearing strength and elongation percentage under 160 kg constant load, in comparison with a foundation (F) card clothing obtained by bonding a conventional wool felt to seven cotton cloths with a natural rubber or synthetic rubber adhesive. The result was as shown below.

TABLE 3

| Sample | Tearing strength | Elongation percentage under 160 kg. constant load |
| --- | --- | --- |
| Foundation (E) for card clothing | 830 kg/52 m.m. | 3.7% |
| Foundation (F) for card clothing | 620 kg/52 m.m. | 6.2% |

From the above, it can be seen that the foundation for card clothing according to the present invention shows about 34% improvement in tearing strength and about half reduction in elongation percentage, in comparison with the conventional foundation for card clothing. By the winding load, neither deformation nor stretching are shown and change in contact pressure after drum winding is little and the problem of "foundation floating" has been eliminated.

Embodiment 4

A uniformly opened fiber mat of the compounding ratio of polyester fiber 12d×51 m.m. 30%/polyester fiber 6d×51 m.m. 70% was needle punched by a needle punching machine from top and bottom sides at the punching density of 300 punches/cm² for formation into a needle punch felt of 750 g/m² in METSUKE (weight per unit area) and 4.5 m.m. in thickness. Then, this needle punch felt was impregnated with a resin solution mainly comprising NBR latex, dried, bridged and pressed into a needle punch felt of 720 g/m² in METSUKE (weight per unit area), 3.3 m.m. in thickness and 0.22 g/cm³ in apparent density. This needle punch felt was made a surface layer.

Next, a uniformly opened fiber mat of polyester fiber 3d×76 m.m. 100% was needle punched by a needle punching machine from top and bottom sides at the punching density of 400 punches/cm² into a needle punch felt of 600 g/m² in METSUKE (weight per unit area) and 3.8 m.m. in thickness. Then, this needle punch felt was impregnated with a resin solution mainly comprising SBR latex, dried, bridged, and pressed into a needle punch felt of 800 g/m² in METSUKE (weight per unit area), 2.0 m.m. in thickness and 0.40 g/cm³ in apparent density. A woven fabric (plain weave) of 195d 34/25 m.m. (Kevlar 29 made by Du Pont or aromatic polyamide filament yarn) as warp and cotton 16s single yarn 67/25 m.m. as weft was bonded to one side of the needle punch felt and a woven fabric of polyester fiber filament yarn (25s two-ply yarn 61/25 m.m. as warp and 16s single yarn 64/25 m.m. as weft) was bonded to the other side with a rubber gum. The base layer of aromatic polyamide woven fabric and a surface layer were bonded together with a chloroprene rubber adhesive into a foundation for card clothing of aggregate thickness of 6.0 m.m.

The foundation (G) for card clothing according to the present invention was tested for tearing strength and elongation percentage under 160 kg constant load, in comparison with a conventional foundation (H) for card clothing obtained by bonding a conventional wool felt (8 m.m. in thickness) to five cotton cloths and one rubber sheet by means of synthetic rubber adhesion. The result was as shown in Table 4.

TABLE 4

| Sample | Tearing strength | Elongation percentage under 160 kg constant load |
|---|---|---|
| Foundation (G) for card clothing | 950 kg/52 m.m. | 2.2% |
| Foundation (H) for card clothing | 400 kg/52 m.m. | 7.8% |

As is obvious from the Table 4, the foundation for card clothing according to the present invention shows a less elongation percentage under constant load and an improved tearing strength, although it has neither cotton cloth nor rubber sheet. Such foundation for card clothing is most suitable for fancy card clothing and raising card clothing in woollen spinning and special spinning, with the result of reduction in manufacturing cost and improvement of quality.

Embodiment 5

A fiber mat made of mixed fibers of polyester fiber 12d×51 m.m. 30%/polyester fiber 6d×51 m.m. 70% was needle punched by a needle punching machine from top and bottom sides at the punching density of 300 punches/cm² into a needle punch felt of 800 g/m² in METSUKE (weight per unit area). Then, this needle punch felt was impregnated with urethane prepolymer and subjected to wet heating treatment and heat pressing for formation into a needle punch felt, having foamed urethane resin between fibers, of 120 g/m² in METSUKE (weight per unit area), 4.0 m.m. in thickness and 0.30 g/cm³ in apparent density as a surface layer.

Next, a uniformly opened and laminated fiber mat of polyester fiber 3d×76 m.m. 100% was needle punched by a needle punching machine from top and bottom sides at the punching density of 400 punches/cm² for formation of a needle punch felt of 400 g/cm² in METSUKE (Weight per unit area) and 3.5 m.m. in thickness. This needle punch felt was impregnated with a urethane prepolymer and subjected to a wet heating treatment and heat pressing for formation into a needle punch felt of 600 g/cm² in METSUKE (weight per unit area), 2.0 m.m. in thickness and 0.3 g/cm³ in apparent density.

A woven fabric (plain weave) using Kevler 29 (made by Du Pont) or aromatic polyamide 20s two-ply yarn 64/inch as warp and cotton 16s single yarn 67/inch as weft was bonded to one side of the foamed needle punch felt and a cotton woven fabric (twill) using 30s two-ply yarn 74/inch as warp and 16s single yarn 67/inch as weft was bonded to the other side, with a rubber gum. Thus, a base layer was formed. Then, a chloroprene rubber adhesive was coated on the surface of the above base layer of aromatic polyamide fiber woven fabric, to which the surface layer of foamed needle punch felt was bonded and thus a foundation for card clothing of 7.5 m.m. in aggregate thickness was obtained.

The foundation for card clothing according to the present invention shows an elongation of 3.4% under a constant load (160 kg) and a tearing strength of 910 kg/52 m.m. Thus, it was high elasticity, stands compressive deformation and is free from deformative elongation due to winding load, carding wire-falling and disorder of carding wire rows, with resultant good fiber opening action. Teflon or silicone resin coating can be given to the surface of the surface layer to impart heat-resistance and oil-resistance to the surface layer. Also, instead of using foamed needle punch felt for a surface layer, foamed seal such as NBR, CR, PUR, etc. can be used.

In the foundation for card clothing according to the present invention, its base layer comprises a high density elastic layer of needle punch felt and aromatic polyamide fiber woven fabric and its surface layer comprises an elastic layer of needle punch felt impregnated uniformly with synthetic rubber, foamed needle punch felt or synthetic rubber foamed substance. Therefore, the foundation possesses toughness and elasticity. In addition, since it is less in elongation percentage, it supports carding wires well, is free from carding wire-pulling off and has good elastic recovery in carding action. Since its base layer has a cloth of aromatic polyamide fiber yarn, it is free from deformative elongation due to the phenomena of stress relief, creep, etc. which occur as a result of winding tension at the card drum winding. Moreover, as it is free from "foundation cloating" even if it is used for long hours at high speeds, durability of the foundation is improved to a large extent.

In the conventional foundation, in order to form it in the desired thickness, it uses costly natural fiber cloth such as cotton cloth and linen cloth, and also uses adhesive in a fairly large quantity. In the foundation according to the present invention, it does not use costly fiber and uses less adhesive, with resultant economy.

What is claimed is:

1. A foundation for card clothing comprising a surface layer having at least one layer selected from a needle punch felt, a foamed sheet of rubber, and a foamed sheet of resin, and a base layer formed by the lamination of at least one layer each of cloth woven from an aromatic polyamide fiber yarn at least as warp, a needle punch felt and cloth woven from a polyester fiber yarn at least as warp.

2. A foundation for card clothing comprising a surface layer having at least one layer selected from a needle punch felt, a foamed sheet of rubber, and a foamed resin, and a base layer formed by the lamination of at least one layer each of cloth woven from an aromatic polyamide fiber yarn at least as warp, a needle punch felt and a cotton cloth.

3. A foundation for card clothing comprising a surface layer having at least one layer selected from a needle punch felt, a foamed sheet of rubber, and a foamed sheet of resin, and a base layer formed by the lamination of at least one layer each of cloth woven from an aromatic polyamide fiber yarn and a cotton cloth or a cloth woven from a polyester fiber yarn at least as warp.

4. A foundation for card clothing as defined in claim 1, 2 or 3 wherein the needle punch felt is a felt impregnated with synthetic rubber or synthetic resin.

5. A foundation for card clothing as defined in claim 1, 2 or 3 wherein the needle punch felt is a foamed needle punch felt treated with foamed synthetic rubber or resin.

6. A foundation for card clothing as defined in claim 1, 2 or 3 wherein the apparent density of the needle punch felt at the surface layer is 0.15–0.4 g/cm$^3$.

7. A foundation for card clothing as defined in claim 1 or 2 wherein the apparent density of the needle punch felt at the base layer is 0.20–0.7 g/cm$^3$.

8. A foundation for card clothing as defined in claim 1, 2 or 3 wherein the surface layer is formed by a foamed substance of rubber or synthetic resin.

9. A foundation for card clothing as defined in claim 1, 2 or 3 wherein the surface layer is formed by a needle punch felt of a density grading type.

10. A foundation for card clothing as defined in claim 1, 2 or 3 wherein the needle punch felt at the surface layer is formed by a thermo-fusing composite fiber or by a mixed fiber including said composite fiber.

* * * * *